United States Patent [19]

Furukawa et al.

[11] Patent Number: 4,801,658

[45] Date of Patent: Jan. 31, 1989

[54] CURABLE RESIN AND PROCESS FOR PREPARING THE SAME

[75] Inventors: Hisao Furukawa, Kobe; Naotami Ando, Hyogo; Yasushi Kato, Kobe, all of Japan

[73] Assignee: Kanegafuchi Kagaku Kogyo Kabushiki Kaisha, Osaka, Japan

[21] Appl. No.: 905,107

[22] Filed: Sep. 8, 1986

[30] Foreign Application Priority Data

Sep. 9, 1985 [JP] Japan ................... 60-199049

[51] Int. Cl.$^4$ ................... C08F 30/08; C08F 230/08
[52] U.S. Cl. ................... 525/450; 525/342; 525/374; 525/326.5; 526/279
[58] Field of Search ................... 525/474, 326.5, 342, 525/450; 526/279

[56] References Cited

U.S. PATENT DOCUMENTS

| | | | |
|---|---|---|---|
| 2,847,409 | 8/1958 | de Benneville | 526/279 |
| 3,179,612 | 3/1965 | Plueddemann | 526/279 |
| 4,191,714 | 3/1980 | Yonezawa et al. | 525/34 L |
| 4,429,082 | 1/1984 | Lee et al. | 525/426 |

*Primary Examiner*—Edward J. Smith
*Assistant Examiner*—Peter F. Kulkosky
*Attorney, Agent, or Firm*—Armstrong, Nikaido, Marmelstein & Kubovcik

[57] ABSTRACT

A curable resin comprising units of at least one prepolymer selected from the group consisting of a prepolymer (C) and a prepolymer (F); the prepolymer (C) having the formula (I):

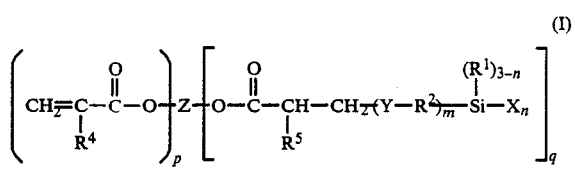

and the prepolymer (F) having the formula (III):

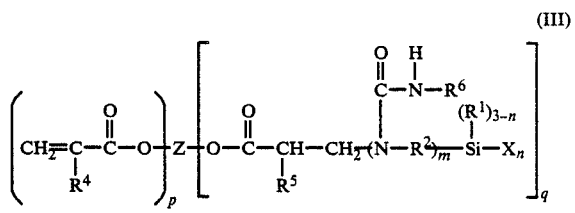

The curable resin has the excellent flexibility, solvent resistance and adhesion to organic materials and the properties thereof can be controlled accordingly to desire, in addition to the excellent curability at ordinary temperature, adhesion to inorganic materials and weatherability.

6 Claims, No Drawings

CURABLE RESIN AND PROCESS FOR PREPARING THE SAME

BACKGROUND OF THE INVENTION

The present invention relates to a curable resin, and more particularly to a curable resin having a hydrolyzable silyl group at the molecular ends or side chains, and having excellent flexibility, solvent resistance and adhesion to organic materials, and a process for preparing the curable resin.

Japanese Unexamined Patent Publication No. 36395/1979 discloses that a hydrolyzable silyl group containing-vinyl resin has excellent curability at ordinary temperature, adhesion to inorganic materials such as concrete, glass, a steel plate and aluminum, and weatherability. However, the silyl group containing-vinyl resin disclosed is unsatisfactory in flexibility, solvent resistance and adhesion to organic materials. For overcoming the above-mentioned defects, it is considered to blend the vinyl resin with other resins. However, the vinyl resin with which other flexible resins are blended has the defect that the dryability is poor though the flexibility can be improved. Also, when the silyl group-containing vinyl resin is blended with other solvent resistant resins to improve the solvent resistance of the vinyl resin, the compatibility with other resins of the obtained resin becomes poor.

An object of the present invention is to provide a hydrolyzable silyl group-containing vinyl resin having the excellent flexibility, solvent resistance and adhesion to organic materials in addition to the excellent curability at ordinary temperature, adhesion to inorganic materials and weatherability.

The above and other objects of the present invention will become apparent from the description hereinafter.

SUMMARY OF THE INVENTION

It has now been found that vinyl resins prepared by polymerizing a particular polymerizable prepolymer having a hydrolyzable silyl group with or without a vinyl monomer are curable at ordinary temperature in the presence of moisture and provide cured products having excellent flexibility, solvent resistance and adhesion to organic materials as well as excellent weatherability, adhesion to inorganic materials and other properties.

In accordance with the present invention, there is provided a curable resin having a number average molecular weight of 1,000 to 100,000 and comprising units of at least one prepolymer selected from the group consisting of a prepolymer (C) having a number average molecular weight of 200 to 60,000 and a prepolymer (F) having a number average molecular weight of 250 to 60,000, said prepolymer (C) having the formula (I):

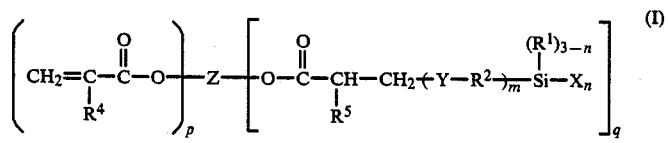

wherein $R^1$ is an alkyl, aryl or aralkyl group having 1 to 10 carbon atoms; $R^2$ is a bivalent group having 1 to 10 carbon atoms selected from the group consisting of alkylene, arylene or aralkylene groups; $R^4$ and $R^5$ are the same or different and each is hydrogen atom or an alkyl group having 1 to 10 carbon atoms; X is a hydrolyzable group selected from the group consisting of a halogen atom, an alkoxyl group, an acyloxyl group, a ketoxymate group, amino group, an acid amide group, aminooxy group, mercapto group and an alkenyloxy group; Y is —S— or

in which $R^3$ is hydrogen atom or an alkyl group having 1 to 10 carbon atoms; Z is a residue of an oligomer (A) having a number average molecular weight of 100 to 50,000 and having at least two groups selected from the group consisting of acryloyloxy group and methacryloyloxy group; p and q are an integer of one or more satisfying the equation of $2 \leq p+q \leq 8$; n is an integer of 1 to 3, and m is an integer of 1 to 10; and said prepolymer (F) having the formula (III):

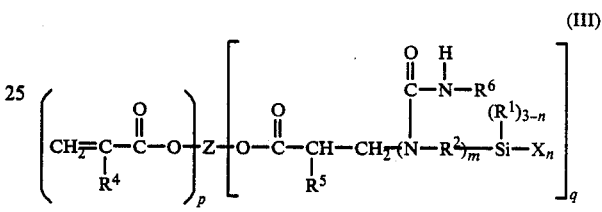

wherein $R^6$ is an alkyl, aryl or an aralkyl group having 1 to 30 carbon atoms or a group having the formula: $(C_2H_5O)_3Si\text{-}(CH_2)_3$; and X, Z, $R^1$, $R^2$, $R^4$, $R^5$, p, q, m and n are as defined above.

The prepolymer (C) is prepared by blocking at least one of the acryloyloxy and/or methacryloyloxy groups of the oligomer (A) with a silane coupling agent (B) having amino group and/or mercapto group of the formula (II):

wherein X, Y, $R^1$, $R^2$ n and m are as defined above. The prepolymer (F) is prepared by blocking active hydrogen of the amino group in the prepolymer (C) with a monofunctional isocyanate compound (E) of the formula (IV):

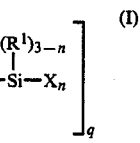

wherein $R^6$ is an alkyl, aryl or aralkyl group having 1 to 30 carbon atoms or a group of the formula: $(C_2H_5O)_3Si\text{-}(CH_2)_3$.

The curable resin of the present invention can be prepared by homopolymerizing the prepolymer (C) and/or (F) or copolymerizing the prepolymer (C) and/or (F) with a vinyl monomer (D) in all proportions. The prepolymer is used in an amount of the least 0.1 part by weight, preferably at least 0.5 part by weight, based on 100 parts by weight of the monomer (D).

DETAILED DESCRIPTION

The prepolymer (C) used in the invention can be prepared by reacting the oligomer (A) having in its molecule two or more acryloyl group and/or methacryloyl group (hereinafter referred to as "(meth)acryloyl group") with the silane coupling agent (B) having active hydrogen.

Examples of the oligomer (A) are, for instance, (1) a polyfunctional acrylate or methacrylate, (2) a polyester acrylate or methacrylate, (3) a polyurethane acrylate or methacrylate, (4) a silicone acrylate or methacrylate, (5) an epoxy acrylate or methacrylate, (6) a polyether acrylate or methacrylate, (7) a polyesterurethane acrylate or methacrylate, and the like. Examples of the polyfunctional acrylate or methacrylate (1) are, for instance, ethylene glycol diacrylate, ethylene glycol dimethacrylate, trimethylolpropane triacrylate, trimethylolpropane trimethacrylate, and the like. The polyester acrylate or methacrylate (2) is prepared by condensing a polyfunctional alcohol such as ethylene glycol, propylene glycol, glycerol, trimethylolpropane, "F-99-199" (an alcohol modifiedsilicone oil) commercially available from Nippon Unicar Kabushiki Kaisha or "F-99-258" (an alcohol modifiedsilicone oil) with a polyfunctional dibasic acid such as phthalic acid or trimellitic acid (benzene-1,2,4-tricarboxylic acid) and an acrylic acid or a methacrylic acid and expamples thereof are, for instance, "Aronix M6100" commercially available from Toagosei Chemical Industry Co., Ltd., "Aronix M6200", "Aronix M6400X", "Aronix M6420X", "Aronix M-6800", "Aronix M-7100", "Aronix M-8030", "Aronix M-8100", and the like. The polyurethane acrylate or methacrylate (3) is prepared by addition reaction of a hydroxyl group-containing acrylate or methacrylate such as 2-hydroxy acrylate or methacrylate with a polyfunctional isocyanate such as tolylene diisocyanate, diphenylmethane-4,4'-diisocyanate, xylylene diisocyanate, hexamethylene diisocyanate, isophorone diisocyanate (1,5,5-trimethylcyclohexen-3-on diisocyanate) or a compound having the formula:

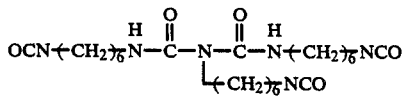

or with an isocyanate group-containing polyurethane obtained by polyaddition of a polyfunctional alcohol such as ethylene glycol, trimethylolpropane, polyesterpolyol, polyetherpolyol, FP-99-199 or FP-99-258 with a polyfunctional isocyanate such as tolylene diisocyanate, diphenylmethane-4,4'-diisocyanate, xylylene diisocyanate, hexamethylene diisocyanate, isophorone diisocyanate (1,5,5-trimethylcyclohexen-3-on diisocyanate) or a compound having the formula:

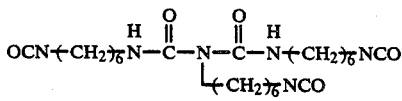

and examples thereof are, for instance, "Aronix M-1100", "Aronix M-1200", "Biscote 813" commercially available from Osaka Yuki Kagaku Kogyo Kabushiki Kaisha, "Biscote 823", and the like). The silicone acrylate or methacrylate (4) is prepared by condensing a silanol group-containing polysiloxane such as "L-9000(100)" (a silanol modified-silicone oil) commercially available from Nippon Unicar Kabushiki Kaisha, "L-9000(1000)" (a silanol modified silicone oil), "L-9800(8000)" (a silanol modified silicone oil), "Y-7005" (a silanol modified silicone oil) with a hydrolyzable silyl group-containing acrylate or methacrylate such as γ-acryloyloxypropyl trimethoxysilane or γ-methacryloyloxypropyl trimethoxysilane, and examples thereof are, for instance, "XF-3492" available from Toray Silicone Co., Ltd. The epoxy acrylate or methacrylate (5) is prepared by condensing an expoxy resin such as "Epicote 828" commercially available from Shell Kagaku Kabushiki Kaisha with an acrylic or methacrylic acid or a hydroxyl group containing acrylate or methacrylate, and examples thereof are, for instance, "Biscote 540" commercially available from Osaka yuki Kagaku Kogyo Kabushiki Kaisha. The polyether acrylate or methacrylate (6) is prepared by condensing a polyether such as polyethylene glycol or polypropylene glycol with an acrylic acid or methacrylic acid, and examples thereof are, for instance, "14EG-A" (commercially available from KYOEISHA YUSHI Chemical Industry Co., Ltd.). The polyesterurethane acrylate or methacrylate (7) is prepared by reacting hydroxyl group of a polycaprolactone acrylate or methacrylate prepared by carrying out the ring opening polymerization of an ε-caprolactone in the presence of a hydroxyl group-containing acrylate or methacrylate such as 2-hydroxyethyl acrylate or methacrylate with a catalyst such as organic titanate, tin chloride or perchloric acid, [examples of the polycaprolactone acrylate or methacrylate being, for instance, "Placcel FM-1" [polycaprolactone containing methacryloyl group at the side end and which has a number average molecular weight (hereinafter referred to as "$\overline{Mn}$") of 244] commercially available from Daicel Chemical Industries, Ltd., "Placcel FM-4" (polycaprolactone containing methacryloyl group at the side end and which has an $\overline{Mn}$ of 600), "Placcel FM-8" (polycaprolactone containing methacryloyl group at the side end and which has an $\overline{Mn}$ of 1000). "Placcel FA-1" (polycaprolactone containing acryloyl group at the side end and which has an $\overline{Mn}$ of 230), "Placcel FA-4" (polycaprolactone containing acryloyl group at the side end, which has an $\overline{Mn}$ of 572,644), "Placcel FA-8" (polycaprolactone containing acryloyl group at the side end, which has an $\overline{Mn}$ of 1000)], with a polyfunctional isocyanate such as tolylene diisocyanate, diphenylmethane-4,4'-diisocyanate, xylylene diisocyanate, hexamethylene diisocyanate, isophorone diisocyanate, a compound having the formula:

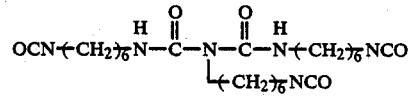

and, if necessary, a polycaprolactone polyol such as "Placcel 205" (polycaprolactone containing hydroxyl groups at the both ends, which has an $\overline{Mn}$ of 500), "Placcel 208" (polycaprolactone containing hydroxyl groups at the both ends, which has an $\overline{Mn}$ of 830), "Placcel 308" (polycaprolactone containing hydroxyl groups at the both ends, which has an $\overline{Mn}$ of 860), "Placcel 212" (polycaprolactone containing hydroxyl groups at the both ends, which has an $\overline{M}n$ of 1250), "Placcel 212Al" (polycaprolactone containing hydroxyl groups at the both end, which has an $\overline{M}n$ of 1250), "Placcel 220" (polycaprolactone containing hydroxyl groups at the both ends, which has an $\overline{M}n$ of 2000), "Placcel 220Al" (polycaprolactone containing hydroxyl groups at the both ends, which has an $\overline{M}n$ of 2000), and the like], FP-99-199, FP-99-258, and the like used as a chain elongating agent. The oligomer (A) including (meth)acrylate groups has an $\overline{M}n$ of 100 to 50,000, preferably from 200 to 20,000.

The silane coupling agent (B) having active hydrogen used in the invention has an amino group and/or mercapto group and is represented by the formula (II):

wherein X is a hydrolyzable group selected from the group consisting of a halogen atom, an alkoxyl group, an acyloxyl group, a ketoxymate group, amino group, an acid amide group, aminooxy group, mercapto group and an alkenyloxy group; Y is —S— or

in which $R^3$ is hydrogen atom or an alkyl group having 1 to 10 carbon atoms; $R^1$ is an alkyl, aryl or aralkyl group having 1 to 10 carbon atoms; $R^2$ is a bivalent group having 1 to 10 carbon atoms selected from the group consisting of alkylene, arylene or aralkylene group; n is an integer of 1 to 3 and m is an integer of 1 to 10. Examples of the silane coupling agent (B) are, for instance, an amino group-containing silane coupling agent such as γ-aminopropyltrimethoxysilane, γ-aminopropyltrimethoxysilane, N-(β-aminoethyl)-γ-aminopropyltrimethoxysilane, N-(β-aminoethyl)-γ-aminopropyltriethoxysilane, $H_2NCH_2CH_2NHCH_2CH_2NHCH_2CH_2CH_2Si(OMe)_3$, $H_2NCH_2CH_2NHCH_2CH_2NHCH_2CH_2CH_2Si(OEt)_3$, γ-aminopropylmethyldimethoxysilane, and N-β-(aminoethyl)-γ-aminopropylmethyldimethoxysilane; a mercapto group containing silane coupling agent such as γ-mercaptopropyltrimethoxysilane, γ-mercaptopropyltriethoxysilane, γ-mercaptopropylmethyldimethoxysilane, $HSCH_2CH_2SCH_2CH_2CH_2Si(OMe)_3$ and $HSCH_2CH_2SCH_2CH_2CH_2Si(OEt)_3$.

In order to obtain the prepolymer (C) from the (meth)acryloyl group-containing oligomer (A) and the silane coupling agent (B) having active hydrogen, the oligomer (A) and the silane coupling agent (B) are mixed and reacted at ordinary temperature to 200° C. in the substantial absence of water.

When the amino group-containing silane coupling agent is used as the silane coupling agent (B) having active hydrogen, it is preferable that the (meth)acryloyl group-containing oligomer (A) is added to the silane coupling agent (B) from the point that the only primary amino group is selectively reacted. Also, in order to inhibit the radical polymerization reaction of (meth)acryloyl groups in the oligomer (A) during the reaction of the oligomer (A) and the silane coupling agent (B), it is preferable to add a polymerization inhibitor such as hydroquinone, benzoquinone, phenothiazine or methyl hydroquinone to the reaction system before the reaction. Methyl hydroquinone is preferable as the polymerization inhibitor from the point of coloration.

The reaction of the oligomer (A) and the silane coupling agent (B) can proceed in the absence of a catalyst, but there may be used a catalyst capable of promoting the addition reaction, e.g., a tertialy amine such as dimethylbenzylamine or 2,4,6-tris(dimethylaminoethyl)-phenol, a quarternary ammonium salt such as benzyltrimethylammonium hydroxide or benzyltrimethylammonium chloride, an alkali such as sodium methoxide, and the like.

In the reaction of the oligomer (A) and the silane coupling agent (B), the silane coupling agent (B) and the oligomer (A) are used in an amount such that the proportion of an active hydrogen containing-group (—SH, —NH— and —NH$_2$) in the silane coupling agent (B) is from 0.1 to 1 mole, preferably from 0.25 to 0.99 mole per mole of (meth)acryloyl group included in the oligomer (A). When the proportion is less than 0.1, the gelation easily occurs when the curable resin of the invention is prepared, and when the proportion is more than 1, it is disadvantageous from the point of the cost though there is no problem from the point of properties of the obtained curable resin of the invention.

When the (meth)acryloyl group-containing oligomer (A) has both acryloyl group and methacryloyl group, it is possible that the acryloyl group in the oligomer (A) is selectively reacted with the silane coupling agent (B) having active hydrogen to give the prepolymer (C).

A solvent may be employed or not in the reaction of the oligomer (A) and the silane coupling agent (B). When the reaction easily proceeds by using the solvent due to properties of components used in the reaction, the solvent can be employed. Examples of the solvents are, for instance, toluene, xylene, butyl acetate, and the like.

In the reaction of the oligomer (A) and the silane coupling agent (B), it is necessary to previously exclude water from the reaction system. When the aromatic solvent is employed, it is possible to previously exclude water from the reaction system by azeotropic distillation.

The thus obtained prepolymer (C) has an $\overline{M}n$ of 200 to 60,000, preferably from 400 to 30,000. The molecular weight per mole of the total amount of (meth)acryloyl groups and silyl group in the prepolymer (C) is 100 to 10,000, preferably from 200 to 5,000. The prepolymer (C) has the formula (I):

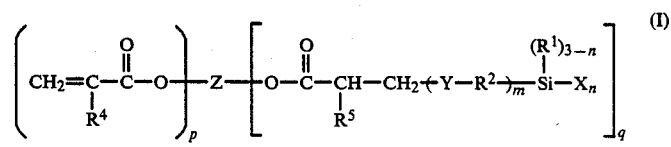

wherein Z is a residue of the (meth)acryloyl group-containing oligomer (A), p and q are same or different and each is an integer of one or more provided that $2 \leq +q \leq 8$, $R^4$ and $R^5$ are same or different and each is hydrogen atom or an alkyl group having 1 to 10 carbon atoms, and X, Y, $R^1$, $R^2$, m and n are as defined above.

The prepolymer (F) having the formula (III):

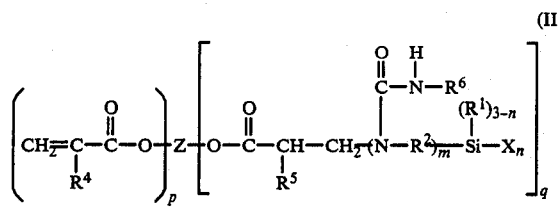 (III)

wherein $R^6$ is an alkyl, an aryl or an aralkyl group having 1 to 30 carbon atoms or a group having the formula: $(C_2H_5O)_3Si-(CH_2)_3$, and $R^1$, $R^2$, $R^4$, $R^5$, X, Z p, q, m and n are as defined above, is prepared by blocking all or a part of active hydrogens of the amino groups in the prepolymer (C) with a monofunctional isocyanate compound (E) having the formula (IV):

$$R^6—NCO \qquad (IV)$$

wherein $R^6$ is as defined above. Examples of the isocyanate (E) are, for instance, methyl isocyanate, ethyl isocyanate, butyl isocyanate, stearyl isocyanate phenyl isocyanate, cyclohexyl isocyanate, benzyl isocyanate, γ-isocyanatepropyltriethoxysilane, and the like.

The prepolymer (C) can be easily reacted with a necessary amount of the isocyanate (E) at ordinary temperature to 60° C. and all or a part of the prepolymers (C) are converted into the prepolymers (F).

The thus obtained prepolymer (F) has an $\overline{M}n$ of 250 to 60,000, preferably from 550 to 30,000. The molar weight per mole of the total amount of (meth)acryloyl groups and silyl group in the prepolymer (F) is from 150 to 10,000, peferably from 250 to 5000.

The curable resin of the invention can be prepared by copolymerizing the thus obtained prepolymer (C) and-/or prepolymer (F) with a vinyl monomer (D). The prepolymer (C) and the prepolymer (F), which have been separately prepared, can be copolymerized with the vinyl monomer (D) at the same time, or a mixture of the prepolymers (C) and (F), which is obtained by blocking a part of the prepolymers (C) with the monofunctional isocyanate (E), can be copolymerized with the vinyl monomer (D). The prepolymer (C) and/or the prepolymer (F) are generally copolymerized with the vinyl monomer in a random copolymerization, also, a block copolymerization or graft-copolymerization may be carried out, and further the crosslinking may occur partially.

The vinyl monomer (D) used in the present invention is not particularly limited. Examples of the vinyl monomer (D) are, for instance, an unsaturated carboxylic ester such as methyl acrylate, methyl methacrylate, ethyl acrylate, ethyl methacrylate, butyl acrylate, butyl methacrylate, 2-ethylhexyl acrylate, 2-ethylhexyl methacrylate, stearyl acrylate, stearyl methacrylate, benzyl acrylate, benzyl methacrylate, cyclohexyl acrylate, cyclohexyl methacrylate, trifluoroethyl acrylate, trifluoroethyl methacrylate, pentafluoropropyl acrylate, pentafluoropropyl methacrylate, a diester or halfester of a polycarboxylic acid (for instance, maleic acid, fumaric acid, itaconic acid, and the like) and a linear or branched alcohol having 1 to 20 carbon atoms; an aromatic hydrocarbon vinyl compound such as styrene, α-methylstyrene, chlorostyrene, styrenesulfonic acid, 4-hydroxystyrene or vinyl toluene; a vinyl ester such as vinyl acetate or vinyl propionate; an allyl compound such as diallylphthalate; a nitrile group-containing vinyl compound such as acrylonitrile or methacrylonitrile; an epoxy group-containing vinyl compound such as glycidyl acrylate or glycidyl methacrylate; an amino group-containing vinyl compound such as dimethylaminoethyl acrylate, dimethylaminoethyl methacrylate, diethylaminoethyl acrylate, diethylaminoethyl methacrylate, vinylpyridine, aminoethyl vinyl ether; an amide group-containing vinyl compound such as acrylamide, methacrylamide, itaconic diamide, α-ethylacrylamide, α-ethylmethacrylamide, crotonamide, maleic diamide, fumaric diamide, N-vinyl pyrrolidone, N-butoxymethyl acrylamide, N-butoxymethyl methacrylamide N,N-dimethylacrylamide, N-methyl acrylamide or acryloyl morpholine; a hydroxyl group-containing vinyl compound such as 2-hydroxyethyl acrylate, 2-hydroxyethyl methacrylate, 2-hydroxypropyl acrylate, 2-hydroxypropyl methacrylate, 2-hydroxyethyl vinyl ether, N-methylolacrylamide, N-methylolmethacrylamide, or "Aronix 5700", "Placcel FA-1", "FA-4", "FA-8", "FM-4", "FM-8" (polyesters containing (meth)acryloyl group at the side end); an unsaturated carboxylic acid such as acrylic acid, methacrylic acid, maleic acid, fumaric acid or itaconic acid or a salt (for instance, alkali metal salt, ammonium salt, amine salt, and the like) thereof; an unsaturated carboxylic acid anhydride such as maleic anhydride or a salt thereof; an other vinyl compound such as vinyl methyl ether, vinyl chloride, vinylidene chloride, chloroprene, propylene, butadiene, isoprene, maleimide, N-vinylimidazole or vinylsulfonic acid; a hydrolyzable silyl group-containing vinyl compound having the formula:

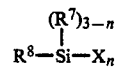

wherein $R^7$ is a monovalent hydrocarbon group having 1 to 10 carbon atoms selected from the group consisting of an alkyl group, an aryl group and an aralkyl group, $R^8$ is an organic residue having a polymerizable double bond and X and n are as defined above; and the like. Examples of the hydroyzable silyl group-containing vinyl compounds are, for instance,

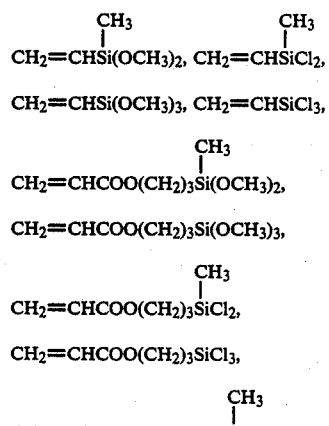

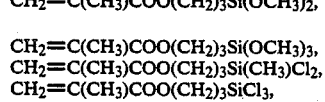

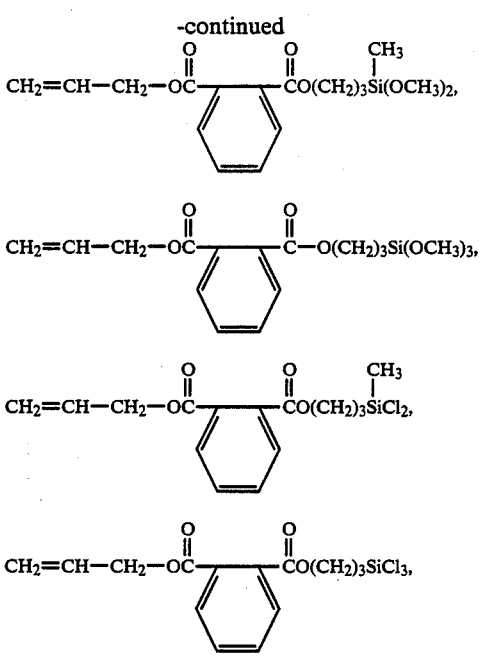

and the like.

When the hydrolyzable silyl group-containing vinyl compounds are used as the vinyl monomer (D), both the hydrolyzable silyl group in the prepolymers (C) and (F) and the hydrolyzable silyl group in the hydrolyzable silane compound can provide crosslinking points, and therefore the use of the vinyl group-containing silane compound is effective for controlling properties of the film.

The total amount of the prepolymer (C) and/or the prepolymer (F) is from 0.1 part by weight, preferably 0.5 part by weight, based on 100 parts by weight of the monomer (D). When the amount of the prepolymer is less than 0.1 part by weight per 100 parts by weight of the vinyl monomer (D), the properties of the obtained curable resin cannot be improved. The prepolymers (C) and (F) may be employed alone or in admixture thereof.

The vinyl monomer (D) is copolymerized with the prepolymer (C) and/or the prepolymer (F), for instance, in the same manner as described in Japanese Unexamined Patent Publication No. 36395/1979 and No. 131145/1980, and the like. Also, a method in which a radical polymerization initiator such as AIBN (azobisisobutyronitrile) is employed, a method in which heat or rays of light or radiation is employed, a bulk polymerization method, a solution polymerization method, and the like are applicable to the copolymerization of the vinyl monomer (D) and the prepolymer (C) and/or the prepolymer (F). Among them, the solution polymerization in which an azo initiator is employed is the most preferable.

In order to stabilize the curable resin of the invention, hydrolyzable esters such as methyl orthoformate, ethyl orthoformate, methyl orthoacetate and ethyl orthoacetate, and hydrolyzable silicon compounds such as ethyl silicate, methyl silicate or methyl trimethoxysilane can be used. These dehydrating agents may be added not only during the copolymerization but also after completing the copolymerization. The amount of the dehydrating agent is from 0 to 20 parts by weight, preferably from 0 to 10 parts by weight, to 100 parts by weight of the curable resin as a solid of the invention.

The obtained curable resin of the invention has an $\overline{M}n$ of 1,000 to 100,000, preferably from 2,000 to 50,000.

When the curable resin of the inventon is exposed to the atmosphere, fine network structure is gradually formed by atmospheric moisture to cure. The curing catalyst may be employed or not upon curing the curable resin of the invention. Examples of the curing catalyst are, for instance, an alkyl titanate; an acid compound such as phosphoric acid, p-toluenesulfonic acid or an acid phosphoric ester e.g. butylphosphate or dibutyl phosphate; an amine such as ethylene diamine or tetraethylenepentamine; an an organo-tin compound such as dibutyltin dilaurate or dibutyltin maleate; a basic compound such as sodium hydroxide or sodium methylate; and the like. The curable resin of the invention is cured in the same manner as described in Japanese Unexamined Patent Publication No. 131145/1980 or 139086/1980, and the like. The amount of the curing catalyst is from 0.005 to 10 parts by weight, preferably 0.1 to 8 parts by weight, to 100 parts by weight of the curable resin.

Usual additions such as fillers and pigments can be added to the curable resin of the invention. Also, a cellulosic resin such as nitrocellulose or cellulose acetate butyrate or a synthetic resin such as a polyvinyl chloride, a polyolefin or a polyester can be blended with the curable resin of the invention.

In addition to the properties of the silyl group-containing vinyl resin including no prepolymers (C) and (F), such as excellent curability at ordinary temperature, adhesion to inorganic materials and weatherability, the curable resin of the invention has the excellent flexibility, solvent resistance and adhesion to organic materials and the properties thereof can be controlled according to desires. The curable resin of the invention is useful as use for paints, coating agents, adhesives, sealants, potting agents, primers, and the like.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

REFERENCE EXAMPLE 1

A reactor equipped with a stirrer, a thermometer, a nitrogen inlet tube and a condenser was charged with 110.7 g of Placcel FM-4 (polycaprolactone containing methacryloyl group at the side end, $\overline{M}n$: 600), 127.3 g of Placcel FA-1 (polycaprolactone containing acryloyl group at the side end, e,ovs/M/ n: 230), 62 g of hexamethylene diisocyanate (hereinafter referred to as "HMDI") and 200 g of xylene and the mixture was reacted with stirring at 80° C. for 2 hours under nitrogen gas to give 500 g of a polycaprolactone containing (meth)acryloyl groups at both ends (solid concentration: 60%).

In the infrared absorption spectrum (hereinafter referred to as "IR") of the obtained resin, the absorption based on NCO (2270 cm$^{-1}$) disappeared completely and the absorption based on (meth)acryloyl group (from 1630 to 1640 cm$^{-1}$) was seen.

Then, a reactor equipped with a stirrer, a thermometer, a nitrogen inlet tube, a dropping funnel and a condenser was charged with 86.9 g of γ-aminopropyl triethoxysilane and 57.8 g of xylene, to which 355.3 g of the obtained polycaprolactone containing (meth)acryloyl groups at the both ends (solid concentration: 60%) was added dropwise with stirring at 20° C. for 2 hours under nitrogen gas, and the reaction was continued at 60° C. for 1 hour to give a prepolymer (I) (solid concentration: 60%).

In the IR of the obtained prepolymer (I), the absorption based on acryloyl group (1410 and 980 cm$^{-1}$) disappeared and the absorption based on methacryloyl group (1640 cm$^{-1}$) was seen. The $\overline{M}n$ measured by gel permeation chromatography (hereinafter referred to as "GPC") was 1100.

REFERENCE EXAMPLE 2

A reactor equipped with a stirrer, a thermometer, a nitrogen inlet tube and a condenser was charged with 256.0 g of Placcel FA-4 (polycaprolactone containing acryloyl group at the side end, $\overline{M}n$: 644), 44.0 g of isophorone diisocyanate (hereinafter referred to as "IPDI") and 200 g of xylene and the mixture was reacted with stirring at 110° C. for 2 hours under nitrogen gas to give 500 g of a polycaprolactone containing acryloyl groups at both ends (solid concentration: 60%).

In the IR of the obtained resin, the absorption based on NCO (2260 cm$^{-1}$) disappeared completely and the absorption based on acryloyl group (1630 cm$^{-1}$) was seen.

Then, a reactor equipped with a stirrer, a thermomether, a nitrogen inlet tube, a dropping funnel and a condenser was charged with 54.0 g of γ-aminopropyl triethoxysilane and 37.0 g of xylene, to which 410.0 g of the obtained polycaprolactone containing acryloyl groups at the both ends (solid concentration: 60%) was added dropwise with stirring at 20° C. for 2 hours under nitrogen gas, and the reaction was continued at 60° C. for 1 hour to give a prepolymer (II) (solid concentration: 60%).

In the IR of the obtained prepolymer (II), the the absorption based on acryloyl group (1630 cm$^{-1}$) was seen. The $\overline{M}n$ measured by GPC was 1800.

REFERENCE EXAMPLE 3

A reactor equipped with a stirrer, a thermometer, a nitrogen inlet tube and a condenser was charged with 71.4 g of Placcel 205 (polycaprolactone containing hydroxyl groups at the both ends, $\overline{M}n$: 500), 47.9 g of HMDI and 200 g of xylene and the mixture was reacted with stirring at 80° C. for 1 hour under nitrogen gas. To the reaction mixture was added 137.9 g of Placcel FA-4 (Mn of 644) and 42.8 g of Placcel FM-4(Mn of 600), which was reacted at 80° C. for 2 hours to give 500 g of a polycaprolactone containing (meth)acryloyl groups at both ends (solid concentration: 60%).

In the IR of the obtained resin, the absorption based on NCO (2270 cm$^{-1}$) disappeared completely and the absorption based on (meth)acryloyl group (from 1630 to 1640 cm$^{-1}$) was seen.

Then, a reactor equipped with a stirrer, a thermometer, a nitrogen inlet tube, a dropping funnel and a condenser was charged with 40.1 g of γ-mercaptopropyl trimethoxysilane, 27.1 g of xylene and 0.5 g of benzyltrimethylammonium hydroxide, to which 432.2 g of the obtained polycaprolactone containing (meth)acryloyl groups at the both ends (solid concentration: 60%) was added dropwise with stirring at 20° C. for 2 hours under nitrogen gas, and the reaction was continued at 80° C. for 2 hours to give a prepolymer (III) (solid concentration: 60%).

In the IR of the obtained prepolymer (III), the absorption based on acryloyl group (1410 and 980 cm$^{-1}$) disappeared and the absorption based on methacryloyl group (1640 cm$^{-1}$) was seen. The $\overline{M}n$ measured by GPC was 2500.

REFERENCE EXAMPLE 4

A reactor equipped with a stirrer, a thermometer, a nitrogen inlet tube, a dropping funnel and a condenser was charged with 63.8 g of IPDI and 0.3 g of dibutyltin dilaurate (hereinafter referred to as "DTL"), to which 66.0 g of Placcel FM-1 (Mn of 244) was continuously added with stirring at 20° C. for 1 hour under nitrogen gas, and the reaction was continued at 60° C. for 30 minutes. To the reaction mixture was added 170.9 g of Placcel FA-4, (Mn of 572)which was reacted at 90° C. for 2 hours and then 199.7 g of xylene was added to the reaction mixture to give 500 g of a polycaprolactone containing (meth)acryloyl groups at both ends (solid concentration: 60%).

In the IR of the obtained resin, the absorption based on NCO (2260 cm$^{-1}$) disappeared completely and the absorption based on (meth)acryloyl group (from 1630 to 1640 cm$^{-1}$) was seen.

Then, a reactor equipped with a stirrer, a thermometer, a nitrogen inlet tube, a dropping funnel and a condenser was charged with 54.1 g of γ-aminopropyl triethoxysilane and 36.1 g of xylene, to which 409.8 g of the obtained polycaprolactone containing (meth)acryloyl groups at the both ends (solid concentration: 60%) was added dropwise with stirring at 20° C. for 2 hours under nitrogen gas, and the reaction was continued at 60° C. for 1 hour to give a prepolymer (IV) (solid concentration: 60%).

In the IR of the obtained prepolymer (IV), the absorption based on acryloyl group (1410 and 980 cm$^{-1}$) disappeared and the absorption based on methacryloyl group (1640 cm$^{-1}$) was seen. The $\overline{M}n$ measured by GPC was 1000.

REFERENCE EXAMPLE 5

A reactor equipped with a stirrer, a thermometer, a nitrogen inlet tube and a condenser was charged with 462.7 g of the prepolymer (IV) (solid concentration: 60%) obtained in Reference Example 4, to which 22.4 g of butyl isocyanate was added dropwise with stirring at 20° C. for 1 hour under nitrogen gas, and the reaction was continued at 60° C. for 1 hour. To the reaction mixture was added 14.9 g of xylene to give 500 g of a prepolymer (V) (solid concentration: 60%).

In the IR of the obtained prepolymer (V), the absorption based on urea bond (1630 cm$^{-1}$) was seen. The $\overline{M}n$ measured by GPC was 1200.

REFERENCE EXAMPLE 6

A reactor equipped with a stirrer, a thermometer, a nitrogen inlet tube, a dropping funnel and a condenser was charged with 142.7 g of IPDI and 0.1 g of DTL, to which 75.2 g of 2-hydroxyethyl methacrylate and 0.4 g of methyl hydroquinone were added dropwise with stirring at 20° C. for 2 hours under nitrogen gas, and the reaction was continued at 20° C. for 2 hours and at 60° C. for 30 minutes.

There were added 82.1 g of 2-hydroxyethyl acrylate and 0.4 g of methyl hydroquinone to the reaction mixture and the reaction was carried out at 90° C. for 2 hours. To the reaction mixture, 199.1 g of xylene was added to give 500 g of a polyurethane containing (meth- )acryloyl groups at both ends (solid concentration: 60%).

In the IR of the obtained prepolymer, the absorption based on NCO (2260 cm$^{-1}$) disappeared and the absorption based on (meth)acryloyl group (from 1630 to 1640 cm$^{-1}$) was seen.

Then, a reactor equipped with a stirrer, a thermometer, a nitrogen inlet tube, a dropping funnel and a condenser was charged with 43.7 g of γ-mercaptopropyl trimethoxysilane 40 g of γ-aminopropyl treimethaxysilane and 73.8 g of xylene, to which 315.5 g of the obtained polyurethane containing (meth)acryloyl groups at the both ends (solid concentration: 60%) was added dropwise with stirring at 20° C. for 2 hours under nitrogen gas, and the reaction was continued at 60° C. for 1 hour to give a prepolymer.

In the IR of the obtained prepolymer, the absorption based on acryloyl group (1410 and 980 cm$^{-1}$) disappeared and the absorption based on methacryloyl group (1640 cm$^{-1}$) was seen.

There was 27.0 g of benzyl isocyanate was added dropwise to the obtained prepolymer at 20° C. for 1 hour to give a prepolymer (VI) (solid concentration: 60%).

In the IR of the obtained prepolymer (VI), the absorption based on urea bond (1630 cm$^{-1}$) was seen, and the $\overline{\text{Mn}}$ measured by gel permeation chromatography (hereinafter referred to as "GPC") was 800.

REFERENCE EXAMPLE 7

A reactor equipped with a stirrer, a thermometer, a nitrogen inlet tube, a dropping funnel and a condenser was charged with 95.9 g of IPDI and 0.1 g of DTL, to which 94.8 g of Placcel FM-1 (Mn of 244) was continuously added dropwise with stirring at 20° C. for 1 hour under nitrogen gas, and the reaction was continued at 20° C. for 2 hours and at 60° C. for 30 minutes. To the reaction mixture was added 109.3 g of Placcel FA-1, (Mn of 230) which was reacted at 90° C. for 2 hours and then 199.9 g of xylene was added to the reaction mixture to give 500 g of a polycaprolactone containing (meth)acryloyl groups at both ends (solid concentration: 60%).

In the IR of the obtained resin, the absorption based on NCO (2260 cm$^{-1}$) disappeared and the absorption based on (meth)acryloyl group (from 1630 to 1640 cm$^{-1}$) was seen.

Then, a reactor equipped with a stirrer, a thermometer, a nitrogen inlet tube, a dropping funnel and a condenser was charged with 63.5 g of γ-aminopropyl trimethoxysilane and 50.7 g of xylene, to which 373.1 g of the obtained polycaprolactone containing (meth)acryloyl groups at the both ends (solid concentration: 60%) was added dropwise with stirring at 20° C. for 2 hours under nitrogen gas, and the reaction was continued at 60° C. for 1 hour to give a prepolymer.

In the IR of the obtained prepolymer, the absorption based on acryloyl group (1410 and 980 cm$^{-1}$) disappeared and the absorption based on methacryloyl group (1640 cm$^{-1}$) was seen.

There was 12.6 g of ethyl isocyanate was added dropwise at 20° C. for 1 hour to give a prepolymer (VII) (solid concentration: 60%).

In the IR of the obtained prepolymer (VII), the absorption based on urea bond (1630 cm$^{-1}$) was seen and the $\overline{\text{Mn}}$ measured by GPC was 1000.

REFERENCE EXAMPLE 8

A reactor equipped with a stirrer, a thermometer, a nitrogen inlet tube, a dropping funnel and a condenser was charged with 75.9 g of F-99-199 and 62.4 g of IPDI and the mixture was reacted with stirring at 120° C. for 2 hours under nitrogen gas. To the reaction mixture, 120.5 g of Placcel FA-4, ($\overline{\text{Mn}}$ of 572) 41.2 g of Placcel FM-4 (Mn of 600) and 200 g of xylene were added and the mixture was reacted at 100° C. for 2 hours to give 500 g of a silicone polyester containing (meth)acryloyl groups at both ends (solid concentration: 60%).

In the IR of the obtained prepolymer, the absorption based on NCO (2270 cm$^{-1}$) disappeared completely and the absorption based on (meth)acryloyl group (from 1630 to 1640 cm$^{-1}$) was seen.

Then, a reactor equipped with a stirrer, a thermometer, a nitrogen inlet tube, a dropping funnel and a condenser was charged with 37.5 g of γ-aminopropyl triethoxysilane and 39.2 g of xylene, to which 401.9 g of the obtained silicone polyester containing (meth)acryloyl groups at the both ends (solid concentration: 60%) was added dropwise with stirring at 20° C. for 2 hours under nitrogen gas, and the reaction was continued at 60° C. for 1 hour. The reacion mixture was cooled to 20° C. and 21.4 g of benzyl isocyanate was added dropwise at 20° C. for 1 hour to give a prepolymer (VIII) (solid concentration: 60%).

In the IR of the obtained prepolymer (VIII), the absorption based on acryloyl group (1410 and 980 cm$^{-1}$) disappeared and the absorption based on methacryloyl was seen. The $\overline{\text{Mn}}$ measured by GPC was 2500.

EXAMPLE 1

A reactor equipped with a stirrer, a thermometer, a nitrogen inlet tube, a dropping funnel and a codenser was charged with 540 g of xylene and 20 g of methyl orthoacetate and the mixture was heated to 110° C. A solution of 333 g of the prepolymer (I) (solid concentration: 60%) obtained in Reference Example 1, 200 g of styrene, 430 g of methyl methacrylate, 50 g of stearyl methacrylate, 100 g of γ-methacryloyloxypropyl trimethoxysilane, 20 g of acrylamide and 36 g of azobisisobutyronitrile was added dropwise to the reactor at 110° C. for 3 hours, to which 4 g of azobisisobutyronitrile was added, and the reaction was continued at 120° C. for 2 hours to give 1730 g of a desired curable resin.

In the IR of the obtained curable resin, the absorption based on (meth)acryloyl group (from 1630 to 1640 cm$^{-1}$) was not seen. The $\overline{\text{Mn}}$ measured by GPC was 6000.

EXAMPLE 2

The procedure of Example 1 was repeated except that the prepolymer (II) was employed instead of the prepolymer (I) to give a curable resin.

In the IR of the obtained curable resin, the absorption based on (meth)acryloyl group (from 1630 to 1640 cm$^{-1}$) was not seen. The $\overline{\text{Mn}}$ measured by GPC was 7500.

EXAMPLE 3

The procedure of Example 1 was repeated except that the prepolymer (III) was employed instead of the prepolymer (I) to give a curable resin.

In the IR of the obtained curable resin, the absorption based on (meth)acryloyl group (from 1630 to 1640 cm$^{-1}$) was not seen. The ($\overline{Mn}$ measured by GPC was 8000.

EXAMPLE 4

The procedure of Example 1 was repeated except that the prepolymer (IV) was employed instead of the prepolymer (I) to give a curable resin.

In the IR of the obtained curable resin, the absorption based on (meth)acryloyl group (from 1630 to 1640 cm$^{-1}$) was not seen. The $\overline{Mn}$ measured by GPC was 6000.

EXAMPLE 5

The procedure of Example 1 was repeated except that the prepolymer (V) was employed instead of the prepolymer (I) to give a curable resin.

In the obtained resin, the $\overline{Mn}$ measured by GPC was 6000.

EXAMPLE 6

The procedure of Example 1 was repeated except that 166.5 g of the prepolymer (IV) and 166.5 g of the prepolymer (V) was employed instead of the prepolymer (I) to give a curable resin. In the obtained resin, the $\overline{Mn}$ measured by GPC was 6500.

EXAMPLE 7

The procedure of Example 1 was repeated except that the prepolymer (VI) was employed instead of the prepolymer (I) to give a curable resin. In the obtained resin, the $\overline{Mn}$ measured by GPC was 6000.

EXAMPLE 8

The procedure of Example 1 was repeated except that the prepolymer (VII) was employed instead of the prepolymer (I) to give a curable resin. In the obtained resin, the $\overline{Mn}$ measured by GPC was 6000.

EXAMPLE 9

The procedure of Example 1 was repeated except that the prepolymer (VIII) was employed instead of the prepolymer (I) to give a curable resin. In the obtained resin, the $\overline{Mn}$ measured by GPC was 7500.

COMPARATIVE EXAMPLE 1

The procedure of Example 1 was repeated except that the prepolymer was not employed to give a silyl group-containing vinyl resin. The $\overline{Mn}$ measured by GPC was 7000.

TEXT EXAMPLE 1

Test pieces were prepared as follows:

Dibutyltin maleate was added to each of the curable resin solutions obtained in Examples 1 to 9 and Comparative Example 1 in an amount of 2 parts based on 100 parts of the resin, which was coated on a mild steel plate polished with No. 240 water-proof abrasive paper. The coated steel plate was dried at 60° C. for 30 minutes. The obtained film on the plate had a thickness of about 100 μ.

(1) Pencil hardness

After the test piece was allowed to stand at 23° C. for 1 day, 3 days or 7 days, the pencil hardness of the film was measured by a pencil hardness tester made by Toyo Seiki Kabushiki Kaisha in a load of 1 kg. The hardest hardness of the pencils which do not damage the film are shown in Table 1.

(2) Xylene-rubbing

After the test piece was allowed to stand at 23° C. for 7 days, the piece was rubbed ten times with an absorbent cotton impregnated with xylene. The surface state of the film was observed whether the surface of the film is damaged or not.

(3) Du pont-impact test

After the test piece was allowed to stand at 23° C. for 7 days, the Du pont-impact was measured with a core having a diameter of ½ inche. The highest weight and height causing no crack on the film are shown in Table 1.

(4) Adhesion after humidity test

After a melamine alkyd resin was coated on a mild steel plate, the plate was baked at 130° C. for 30 minutes. The surface of the steel melamine alkyd was sanded with a No. 400 water-proof abrasive paper and degreased, and then each of the curable resin solutions obtained in Examples 1 to 9 and Comparative Example 1 was coated and dried in the same manner as mentioned above to give a test piece having a film thickness of about 100 μ. After the test piece was allowed to stand at ordinary temperature for 3 days and in a blister box (temperature: 50° C. RH 98 %) for 3 days, the adhesive test was carried out. The test piece was cut to from 50 squares each having a size of 2×2 mm and the procedure of adhesion-peeling off of cellophane adhesive tape was conducted. The number of remaining squares were counted. For example, when there is not peeled square, the mark is 10, and when there is no adhered aquare, the mark is 0.

TABLE 1

| | Pencil hardness | | | | | Adhesion after |
|---|---|---|---|---|---|---|
| | 1 day | 3 days | 7 days | Xylene rubbing | Du Pont impact test | humidity test |
| Ex. No. | | | | | | |
| Ex. 1 | B | HB | H | ○*2 | 300 g × 50 cm | 10 |
| Ex. 2 | B | HB | H | ○ | 500 g × 40 cm | 10 |
| Ex. 3 | 2B | B | F | ○ | 1 kg × 30 cm | 7 |
| Ex. 4 | B | HB | H | ○ | 500 g × 50 cm | 10 |
| Ex. 5 | B | HB | H | ◎*1 | 500 g × 50 cm | 7 |
| Ex. 6 | B | HB | H | ◎ | 500 g × 50 cm | 8 |
| Ex. 7 | B | HB | 2H | ◎ | 500 g × 30 cm | 10 |
| Ex. 8 | B | HB | 2H | ◎ | 500 g × 50 cm | 10 |
| Ex. 9 | 2B | B | F | ○ | 1 kg × 50 cm | 7 |
| Com. Ex. 1 | B | HB | H | △*3 | 300 g × 20 cm | 1 |

Estimation
*1 ◎: no-damage
*2 ○: slightly etched
*3 △: gradated

What we claim is:

1. A curable resin having a number average molecular weight of 1,000 to 100,000 of a copolymer of a prepolymer (F) having a number average molecular weight of 250 to 60,000 with a vinyl monomer (D) having a molecular weight of 53 or greater, said prepolymer (F) having the formula (III):

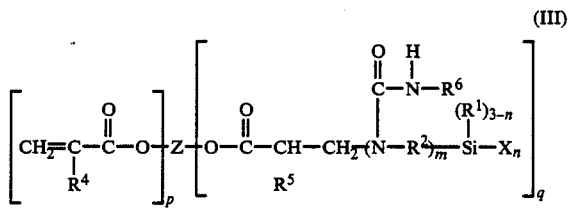

wherein $R^1$ is an alkyl, aryl, or aralkyl group having 1 to 10 carbon atoms; $R^2$ is a bivalent group having 1 to 10 carbon atoms selected from the group consisting of alkylene groups, arylene groups and aralkylene groups; $R^4$ and $R^5$ are the same or different and each is a hydrogen atom or an alkyl group having 1 to 10 carbon atoms; X is a hydrolyzable group selected from the group consisting of halogen atoms, alkoxyl groups, acyloxyl groups, ketoxymate groups, amino groups, acid amide groups, aminooxy groups, mercapto groups and alkenyloxy groups; Z is a residue of an oligomer (A) having a number average molecular weight of 100 to 50,000 and having at least two groups selected from the group consisting of acryloyloxy groups and methacryloxy groups; $R^6$ is an alkyl, aryl or aralkyl group having 1 to 30 carbon atoms or a group having the formula: $(C_2H_5O)_3-Si-(CH_2)_3-$; p and q are an integer of one or more satisfying the equation of $2<p+q<8$; n is an integer of 1 to 3, and m is an integer of 1 to 10 wherein the amount of said prepolymer (F) is at least 0.1 part per weight per 100 parts by weight of said vinyl monomer.

2. A process for preparing a curable resin having a number average molecular weight of 1,000 to 100,000, which comprises copolymerizing a prepolymer (F) having a number average molecular weight of 250 to 60,000 with a vinyl monomer (D) having a molecular weight of 53 or greater, said prepolymer (F) having the formula (III):

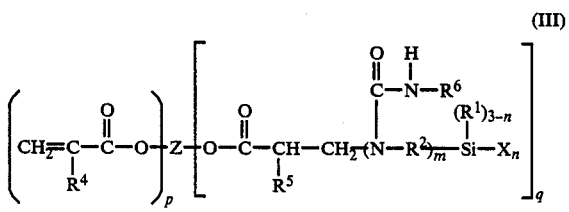

wherein $R^1$ is an alkyl, aryl, or aralkyl group having 1 to 10 carbon atoms; $R^2$ is a bivalent group having 1 to 10 carbon atoms selected from the group consisting of alkylene groups, arylene groups and aralkylene groups; $R^4$ and $R^5$ are the same or different and each is a hydrogen atom or an alkyl group having 1 to 10 carbon atoms; X is a hydrolyzable group selected from the group consisting of halogen atoms, alkoxyl groups, acyloxyl groups, ketoxymate groups, amino groups, acid amide groups, aminooxy groups, mercapto groups and alkenyloyy groups; Z is a residue of an oligomer (A) having a number average molecular weight of 100 to 50,000 and having at least two groups selected from the group consisting of acryloyloxy groups and methacryloyloxy groups; $R^6$ is an alkyl, aryl or aralkyl group having 1 to 30 carbon atoms or a group having the formula: $(C_2H_5O)_3-Si-(CH_2)_3-$; p and q are an integer of one or more satisfying the equation of $2<p+q<8$; n is an integer of 1 to 3, and m is an integer of 1 to 10 wherein the amount of said prepolymer (F) is at least 0.1 part per weight per 100 parts by weight of said vinyl monomer.

3. A curable resin of claim 1, wherein said prepolymer (F) is prepared by blocking active hydrogen of the amino group of a prepolymer (C) with a monofunctional isocyanate compound (E) having the formula (IV):

$$R^6-NCO$$

wherein $R^6$ is an alkyl, aryl or on aralkyl group having 1 to 30 carbon atoms or group having the formula:

$$(C_2H_5O)_3-Si-(CH_2)_3,$$

said prepolymer (C) having the formula (I):

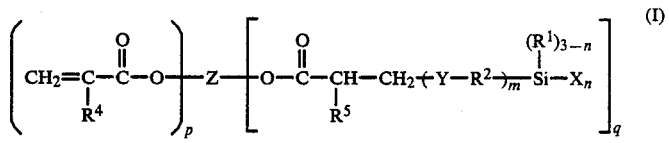

wherein $R^1$ is an alkyl, aryl, or aralkyl group having 1 to 10 carbon atoms; $R^2$ is a bivalent group having 1 to 10 carbon atoms selected from the group consisting of alkyene groups, arylene groups and aralkylene groups; $R^4$ and $R^5$ are the same or different and each is a hydrogen atom or an alkyl group having 1 to 10 carbon atoms; X is a hydrolyzable group selected from the group consisting of halogen atoms, alkoxyl groups, acyloxyl groups, ketoxymate groups, amino groups, acid amide groups, aminooxy groups, mercapto groups and alkenyloxy groups; Y is $-S-$ or

in which $R^3$ is a hydrogen atom or an alkyl group having 1 to 10 carbon atoms; Z is a residue of an oligomer (A) having a number averatge molecular weight of 100 to 50,000 and having at least two groups selected from the group consisting of acryloyloxy groups and methacryloyloxy groups; p and q are an integer of one or more satisfying the equation of $2<p+q<8$; n is an integer of 1 to 3, and m is an integer of 1 to 10, and said prepolymer (C) is prepared by reacting at least one group selected from the group consisting of acryloyl group and methacryloyl group of said oligomer (A) with a silane coupling agent (B) in the substantial absence of water.

4. The curable resin of claim 1, wherein said prepolymer (F) is prepared by blocking active hydrogen of the amino group of a prepolymer (C) with a monofunctional isocyonate compound (E) having the formula (IV):

R⁶—NCO wherein R⁶ is an alkyl, aryl or on aralkyl group having 1 to 30 carbon atoms or group having the formula:

(C₂H₅O)₃—Si—(CH₂)₃, said prepolymer (C) having the formula (I):

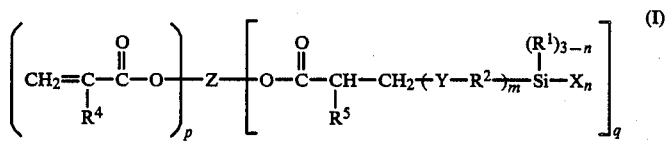

wherein R¹ is an lkayl, aryl, or aralkyl group having 1 to 10 carbon atoms; R² is a bivalent group having 1 to b 10 carbon atoms selected from the group consisting of alkylene groups, arylene groups and aralkylene groups; R⁴ and R⁵ are the same or different and each is a hydrogen atom or an alkyl (group having 1 to 10 carbon atoms; x is a hydrolyzable group selected from the group consisting of halogen atoms, alkoxyl groups, acryloxyl groups, ketoxymate groups, amino groups, acid amide groups, aminooxy groups, mercapto groups and alkenyloxy groups; Y is —S— or

—N—
|
R³ in which R³ is a hydrogen atom or an alkyl group having 1 to 10 carbon atoms; Z is a residue of an oligomer (A) having a number average molecular weight of 100 to 50,000 and having at least two groups selected from the group consisting of acryloyloxy groups and methacryloyloxy groups; p and q are an integer of one or more satisfying the equation of 2<p+q<8; n is an integer of 1 to 3, and m is an integer of 1 to 10, and said prepolymer (C) is prepared by selectively reacting the acryloyl group of said oligomer (A) having both an acryloyl group and a methacryloyl group with a silane coupling agent (B) in the substantial absence of water.

5. The process of claim 2, wherein said prepolymer (F) is prepared by blocking active hydrogen of the amino group in a prepolymer (C) having the formula (I):

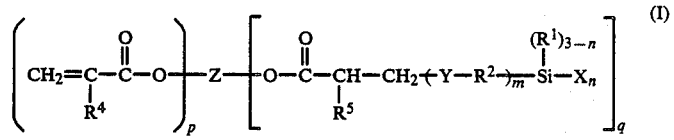

where R¹ is an alkyl, aryl, or aralkyl group having 1 to 10 carbon atoms; R² is a bivalent group ahving 1 to 10 carbon atoms selected form the group consisting of alkyelne groups, arylene groups and aralkylene groups; R⁴ and R⁵ are the same or different and each is a hydrogen atom or an alkyl group having 1 to 10 carbon atoms; x is a hydrolyzable group selected from the group consisting of halogen atoms, alkoxyl groups, acyloxyl groups, ketoxymate groups, amino groups, acid amide groups, aminooxy groups, mercapto groups and alkenyloxy groups; Y is —S— or

—N—
|
R³ in which R³ is hydrogen atom or an alkyl group having 1 to 10 carbon atoms; Z is a residue of an oligomer (A) having a number average molecular weight of 100 to 50,000 and having at least two groups selected from the group consisting of acryloyloxy groups and methacryloyloxy groups; p and q are an integer of one or more satisfying the equation of 2<p+q<8; n is an integer of I to 3, and m is an integer of 1 to 10, with a monofunctional isocyanate compound (E) having the formula (IV):

R⁶—NCO wherein R⁶ is an alkyl, aryl or an aralkyl group having 1 to 30 carbon atoms or group having the formula:

(C₂H₅O)₃—Si—(CH₂)₃.

6. The curable resin of claim 1, wherein the main chain of said oligomer (A) is mainly a polyester.

* * * * *